(12) United States Patent
Van der Hoeven

(10) Patent No.: US 7,376,938 B1
(45) Date of Patent: May 20, 2008

(54) METHOD AND SYSTEM FOR DISAMBIGUATION AND PREDICTIVE RESOLUTION

(75) Inventor: Steven Van der Hoeven, 7/9 Avenue de Grande Bretagne, 98000 Monaco (BE)

(73) Assignee: Steven Van der Hoeven, Monaco (BE)

( * ) Notice: Subject to any disclaimer, the term of this patent is extended or adjusted under 35 U.S.C. 154(b) by 637 days.

(21) Appl. No.: 10/800,203

(22) Filed: Mar. 12, 2004

(51) Int. Cl.
*G06F 9/45* (2006.01)
(52) U.S. Cl. ........................................ 717/136
(58) Field of Classification Search ........... 717/136; 715/533; 700/44
See application file for complete search history.

(56) References Cited

U.S. PATENT DOCUMENTS

| | | | |
|---|---|---|---|
| 4,481,508 A | 11/1984 | Kamei et al. | |
| 4,544,276 A | 10/1985 | Horodeck | |
| 4,969,097 A | 11/1990 | Levin | |
| 5,067,103 A | 11/1991 | Lapeyre | |
| 5,087,910 A | 2/1992 | Guyot-Sionnest | |
| 5,109,352 A | 4/1992 | O'Dell | |
| 5,128,672 A | 7/1992 | Kaehler | |
| 5,187,480 A | 2/1993 | Thomas et al. | |
| 5,255,310 A | 10/1993 | Kim et al. | |
| 5,388,061 A | 2/1995 | Hankes | |
| 5,410,306 A | 4/1995 | Ye | |
| 5,488,363 A | 1/1996 | Peng | |
| 5,535,421 A | 7/1996 | Weinreich | |
| 5,713,033 A | 1/1998 | Sado | |
| 5,724,031 A | 3/1998 | Huang | |
| 5,786,776 A | 7/1998 | Kisaichi et al. | |
| 5,847,697 A | 12/1998 | Sugimoto | |
| 5,881,169 A | 3/1999 | Henry, Jr. | |
| 5,936,556 A | 8/1999 | Sakita | |
| 5,945,928 A | 8/1999 | Kushler et al. | |
| 6,005,498 A | 12/1999 | Yang et al. | |
| 6,006,221 A * | 12/1999 | Liddy et al. | 707/5 |
| 6,037,942 A | 3/2000 | Millington | |
| 6,054,941 A | 4/2000 | Chen | |
| 6,075,469 A | 6/2000 | Pong | |

(Continued)

FOREIGN PATENT DOCUMENTS

GB          2195040 A          3/1988

OTHER PUBLICATIONS

Clearly, et al., "A Comparison of Enumerative and Adaptive Codes," IEEE Transactions on Information Theory, vol. IT-30, No. 2, Mar. 1984, pp. 306-315.

(Continued)

*Primary Examiner*—John Chavis
(74) *Attorney, Agent, or Firm*—Sprinkle IP Law Group

(57) ABSTRACT

Apparatuses, methods and systems for the efficient entry of data on a device with a restricted set of input channels are disclosed. These apparatuses, systems and methods may employ a user interface which allows efficient entry of input. This interface may be tailored according to the device with which it is used, and the semantic meaning associated with the interface. To assist in the efficient entry of data, these apparatuses, systems and methods may disambiguate user input, provide an efficient way to specify the input exactly, or predict user input. These apparatuses, systems and methods may also adapt to the proclivities of a certain user, and incorporate user defined abbreviations and synonyms for frequently used inputs.

55 Claims, 10 Drawing Sheets

U.S. PATENT DOCUMENTS

| | | | |
|---|---|---|---|
| 6,098,086 A | 8/2000 | Krueger et al. | |
| 6,172,625 B1 | 1/2001 | Jin et al. | |
| 6,184,803 B1 | 2/2001 | Burrell, IV | |
| 6,204,848 B1 | 3/2001 | Nowlan et al. | |
| 6,286,064 B1 | 9/2001 | King et al. | |
| 6,295,052 B1 | 9/2001 | Kato et al. | |
| 6,307,548 B1 | 10/2001 | Flinchem et al. | |
| 6,346,894 B1 | 2/2002 | Connolly et al. | |
| 6,349,147 B1 | 2/2002 | Pong et al. | |
| 6,362,752 B1 | 3/2002 | Guo et al. | |
| 6,370,518 B1 | 4/2002 | Payne et al. | |
| 6,377,685 B1 | 4/2002 | Krishnan | |
| 6,437,709 B1 | 8/2002 | Hao | |
| 6,460,015 B1 | 10/2002 | Hetherington et al. | |
| 6,498,608 B1 | 12/2002 | Dresevic et al. | |
| 6,525,676 B2 | 2/2003 | Kisaichi et al. | |
| 6,542,170 B1 | 4/2003 | Williams et al. | |
| 6,562,078 B1 | 5/2003 | Yang et al. | |
| 6,603,489 B1 | 8/2003 | Edlund et al. | |
| 6,636,162 B1 | 10/2003 | Kushler et al. | |
| 6,646,573 B1 | 11/2003 | Kushler et al. | |
| 6,662,025 B1 | 12/2003 | Bond et al. | |
| 2002/0087605 A1 | 7/2002 | Su et al. | |
| 2002/0110237 A1 | 8/2002 | Krishnan | |
| 2003/0067495 A1 | 4/2003 | Pu et al. | |
| 2003/0222800 A1 | 12/2003 | Uke | |
| 2003/0234821 A1 | 12/2003 | Pugliese | |
| 2004/0004558 A1 | 1/2004 | Fux | |
| 2004/0008129 A1 | 1/2004 | Philipp | |
| 2004/0243257 A1* | 12/2004 | Theimer | 700/44 |
| 2005/0044495 A1* | 2/2005 | Lee et al. | 715/533 |
| 2007/0079239 A1* | 4/2007 | Ghassabian | 715/707 |
| 2007/0083359 A1* | 4/2007 | Bender | 704/9 |

OTHER PUBLICATIONS

Clearly, et al., "Data Compression Using Adaptive Coding and Partial String Matching," IEEE Transactions on Communications, vol. Com-32, No. 4, Apr. 1984, pp. 396-402.

* cited by examiner

METHOD AND SYSTEM FOR DISAMBIGUATION AND PREDICTIVE RESOLUTION

RELATED APPLICATIONS

This application is related to U.S. patent application Ser. No. 10/800,204, entitled "Apparatus Method and System for a Data Entry Interface" by Van der Hoeven filed of an even date. All applications cited within this paragraph are fully incorporated herein by reference.

TECHNICAL FIELD OF THE INVENTION

The invention relates in general to data entry, and more particularly, to interfaces and logic for the efficient entry of data into devices.

BACKGROUND OF THE INVENTION

Since the dawn of the computer age one of the most steady and continuous trends has been toward miniaturization. This trend manifests itself in every facet of the industry. Cell phones, personal digital assistants (PDAs), portable computers etc. have all decreased in size at astounding rates. Conversely, however, as these devices have shrunk they have also become more powerful. This dichotomy is somewhat problematic. The need to communicate information to, and glean information from, a user increases commensurately with the power of a device, while the real estate available for these display and data entry interfaces naturally shrinks along with the device.

With each of the two subsystems of data entry and display, there are inherent physical limitations on possible size reduction before each subsystem becomes either ineffective or useless. The physical limitations placed on communications to a user are much greater than those placed on an interface for data entry. These limitations may include hardware limitations, physiological limitations, and the fact that, in most cases, data must be communicated to a user visually. Therefore, the majority of a device's footprint reserved for communications and data entry may be taken up by a visual display. This visual display leaves little room for an interface for data entry.

Solutions to address this problem have been devised by incorporating handwriting software in a device. To utilize this solution, a user may directly enter text by writing on a touch sensitive display. This handwritten data is then converted by handwriting recognition software into digital data. While this solution allows one display to both communicate information to, and receive data from, a user, the accuracy and speed of handwriting recognition software is notoriously bad. Additionally, printing or writing with a stylus is generally slower than typing, or key based input, and requires the use of two hands.

It is therefore advantageous to use an interface for entering data which is small and may be operated with one hand. Prior attempts at such a keyboard have resulted in the development of a keyboard that has a reduced number of keys. FIG. 1 shows a prior art reduced keypad 100 for a device. The keypad 100 is a standard telephone keypad having ten number keys 110-128 an asterisk (*) key 130, and a pound (#) key 140. For English, and many other alphabet languages, the numeric keypad of the telephone is overlaid with an alphabet keypad where three letters are associated with each number key 110-128. For example, the two (2) key 114 is associated with the letters a-b-c. With some of these reduced key devices, a user may employ multiple key presses to enter words or names.

However, this solution is problematic as well, as Chinese and other character based languages such as Japanese kanji do not have a manageable number of letters which can be overlaid onto a numeric keypad. An additional problem is that each key press may contain multiple characters, creating ambiguity in a sequence of keystrokes.

A solution to the problem of ambiguity is to have the user enter two or more keystrokes to specify each letter, the keystrokes may be entered simultaneously (chording) or in sequence. However, these approaches require many keystrokes and are consequently inefficient. Ideally, a data entry method would require one keystroke per letter.

In the past, word level disambiguation has been used to disambiguate entire words by comparing the sequence of received keystrokes with possible matches in a dictionary. But, because of decoding limitations, word level disambiguation does not give error free decoding of unconstrained data with an efficiency of one keystroke per character.

Thus, there is a need for apparatuses, methods and systems for interfaces which enable the efficient one-handed entry of a variety of data, and the ability to reduce the number of strokes required for data entry by using logic for the resolution of character ambiguity and the predictive completion of input.

SUMMARY OF THE INVENTION

Apparatuses, methods and systems for the efficient input of text on a device with a restricted set of input channels are disclosed. These apparatuses, systems and methods may employ a user interface which allows efficient one handed operation by using a key layout that may be manipulated by the thumb of a single hand. This interface may be tailored to the specific device on which it is utilized, and in some instances multiple characters may be associated with each key or portion of a key. To assist in the efficient entry of data, these apparatuses, systems and methods may disambiguate user input in the case where data entered by the user may have several interpretations, provide an efficient way to specify the input exactly, or predict user input and submit these predictions to the user. These predictive systems and methods may also adapt to the proclivities of a certain user, and incorporate abbreviations, translations, and synonyms for frequently used inputs.

In one embodiment, a candidate may be formulated based on a prefix and an input, a prediction may be formulated based on the set of symbols associated with the candidate and a proposition formulated based on the candidate or the prediction.

In similar embodiments, the prefix is empty, entered by a user, or a previous proposition.

In other embodiments, the score of the candidate is based on a score of the prefix concatenated with the input.

In still other embodiments, the score of the candidate is based on a score of the input combined with the score of the prefix.

In yet other embodiments, the set of candidates is ranked based upon the score of each of the candidates.

In another embodiment, a candidate is formulated based on a language model.

In various other embodiments, the score of the input is based on a string which is the longest string in the language model which is a extension of the prefix.

In still another embodiment, a prediction is formulated based on a usage model.

In some embodiments, the prediction is a sequence corresponding to a path through a tree starting from a node based on the candidate and ending with a terminal node.

In other embodiments, formulating a prediction is based on scoring each of the predictions based on frequency of appearance and length of the path through the tree.

In one embodiment, a set of synonyms is determined for the prediction.

In an additional embodiment, a set of synonyms, a set of predictions and a set of candidates are stored, the set of synonyms, the set of candidates, and the set of predictions are ranked.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

Figure 1:
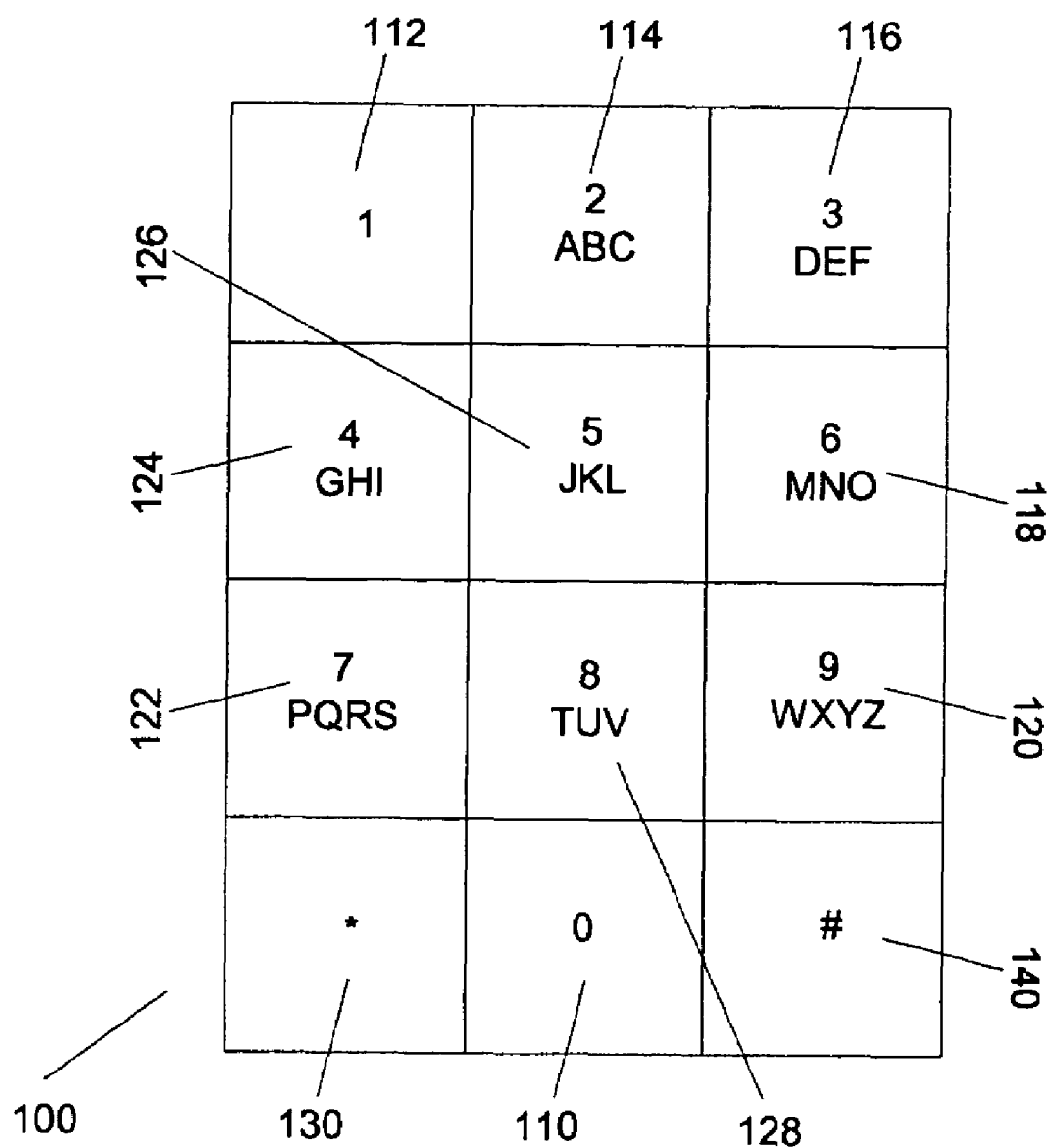
FIG. 1 includes an illustration of a prior art reduced keypad.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification.

The term "character" is intended to mean any symbol whatsoever, a character may be a letter, a diacritical mark, a portion of a kanji, any symbol with a connotation in the art of writing and printing, etc.

The term "key" is intended to mean a zone of an interface, responsive to a user action, including touch. Semantic meaning may be associated with a key or portions of a key, this semantic meaning may consist of one or more characters or control information.

The term "keyboard" is intended to mean a grouping of keys.

The term "prediction" is intended to mean the results of an attempt to predict the completion of a sequence of symbols. This prediction may be based on any type of system, including probabilistic, mathematical, linguistic, or any other.

The term "synonym," as used with respect to a use model, is intended to mean a possible alternative to a prediction. These synonyms may be associated with the prediction, and may be stored in a data structure corresponding to a prediction, or the terminal node corresponding to a prediction.

The term "proposition" is intended to mean a sequence of one or more characters, or a set of these sequences.

The term "prefix" is intended to mean a sequence of one or more characters which may or may not be extended with a user input, the results of disambiguation or prediction etc.

The term "candidate" is intended to mean a sequence of one or more characters and an associated score. This score may be based on any model including probabilistic, mathematical, linguistic, or any other.

The term "active zone" is intended to mean a zone of an interface which is designated to be part of an interface used to receive input from a user.

The term "zone" is intended to mean an area of an interface or within the purview of a sensor.

The term "ambiguous" is intended to mean that something may have several possible meanings.

The term "completion" is a set of symbols which may form a desired final or intermediate sequence of symbols when concatenated with an initial set of symbols (usually referred to as prefix). In many circumstances a completion may have been calculated to have a high probability of forming the desired final or intermediate sequence.

The term "send a message" is intended to mean transmission or exchange or utilization of information. It is important to note that no assumption may be made about how a message is sent, or even if the sending of a message is necessary in any particular embodiment.

The term "sequence" is intended to mean a finite number of elements with a notion of order. A set may be empty or contain only one element. This is a definition commonly accepted in mathematics. We note it as $(e_1, \ldots, e_n)$ The term "set" is intended to mean a finite number of elements with no notion of order. A set may be empty or contain one element. This is a definition commonly accepted in mathematics. We note it as $\{e_1, \ldots, e_n\}$.

The term "type" is intended to mean a range of values or classes. Typing a variable or a value is to enumerate it, or specify the values or classes it may be. Typing an element E with a type T is written as followed: "E:T"

The term "structure" is intended to mean an ordered set of elements $(e_1, \ldots, e_n)$. Each element $e_i$ may be typed with the type $t_i$. The type of the structure is then the sequence (t1, ..., tn).

The term "field" is intended to mean an element of a structure. Fields can be named. P(e:t) implies the structure P has a field e of type t. If p is of type P (as above), p.e represents the field of the element p.

Attention is now directed to apparatuses, methods and systems for the efficient input of text on a device with a restricted set of input channels. These apparatuses, systems and methods may employ a user interface which allows efficient one handed operation by using a key layout that may be manipulated by the thumb of a single hand. This interface may be tailored to the specific device on which it is utilized, and in some instances, multiple characters may be associated with each key or portion of a key. To assist in the efficient entry of data, these apparatuses, systems and methods may disambiguate the user input from these keys in the case where data entered by the user may have several interpretations, or may provide an efficient way for a user to specify the input exactly. These systems and methods may also predict user input and submit these predictions to the user so they may be selected by the user, instead of requiring the user to enter the entire text manually. These predictive systems and methods may also adapt to the proclivities of a certain user, and incorporate user defined abbreviations and synonyms for frequently used inputs.

In an illustrative embodiment of the invention, the computer-executable instructions may be lines of assembly code or compiled C++, Java, or other language code. Other architectures may be used. Additionally, a computer program or its software components with such code may be embodied in more than one computer system readable medium or in more than one computer.

Figure 2:
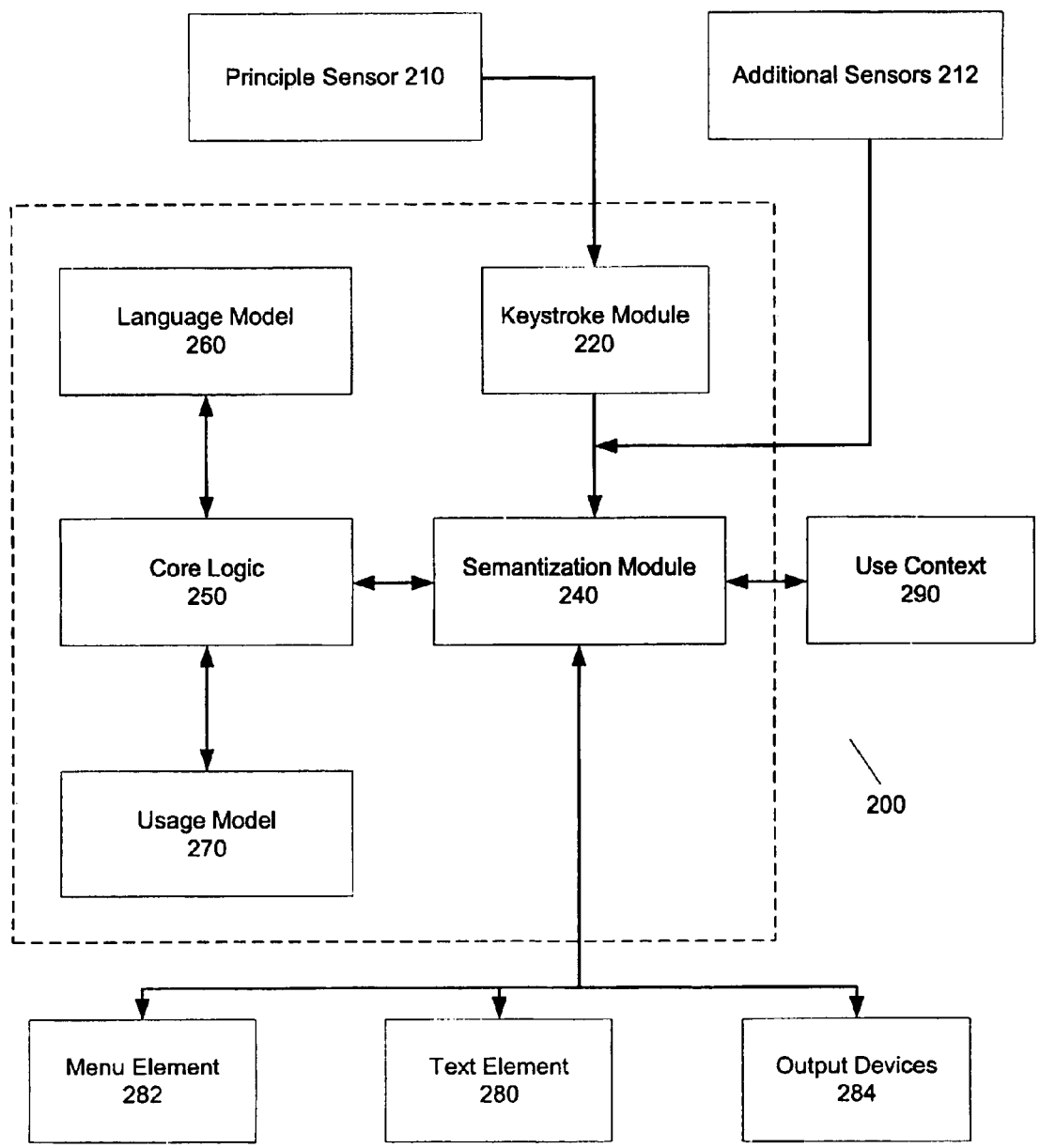
FIG. 2 includes a representation of one possible architecture for implementing the disclosed systems and methods.

Turning now to FIG. 2, one embodiment of an architecture 200 for implementing and organizing the apparatuses, methods and systems disclosed is presented. After reading this specification, skilled artisans will appreciate that many other architectures may be utilized with embodiments of the present invention. In one embodiment, these architectures include principal sensor 210, additional sensors 212, keystroke module 220, semantization module 240, core logic 250, language model 260 and usage model 270. Keystroke module 220 may receive data from principle sensor 210. Keystroke module 220 processes this data and sends the results to semantization module 240. Semantization module 240 takes the results from keystroke module 220 and from any additional sensors 212. Semantization module 240 may then process this data to formulate data for use by core logic 250 using use context 290, text element 280, menu element 282 and output devices 284. Core logic 250 may resolve ambiguity or predictively complete a user's input using input from semantization module 240, language model 260 or usage model 270. Core logic 250 may present its results to semantization module 240. Semantization module may then output results through a combination of use context 290, text element 280, menu element 282 and output devices 284.

In general, this architecture is designed to enhance a user's ability to input data on a device by allowing a wide variety of configurations for an input device, including a configuration designed for use by the thumb of one hand. Embodiments may also disambiguate input, allow a user an efficient way to unambiguously specify the exact input, and submit predictive completions to a user in order to avoid additional manual input. A person of ordinary skill in the art will realize, after reading this disclosure, that this architecture is presented for descriptive purposes only; and that all the functionality described may be embodied in a wide variety of ways, including with more or fewer modules, with messages or without messages being passed, in software, in hardware, etc.

In specific embodiments, a user's actions are captured by sensors 210, 212 and reported to the semantization module 240. In some embodiments, information from principle sensor 210 may be processed by keystroke module 220 before being reported to semantization module 240. Semantization module 240 may be the only interface to a user, and may be responsible for translating and formatting all incoming and outgoing messages. The translation of semantization module 240 may be context dependent or may provide parameterization for integration into a system. Core logic 250 may contain rules for managing the interaction between semantization module 240 and a user, including prediction of user input and resolution of ambiguity.

Core logic 250 may use data structures, including language model 260 for disambiguating user input, and user model 270 to predict user input. Text element 280, menu element 282, and other optional output devices 284 may be used by semantization module 240 to show the results of its logic or the state of the system. Text element 280 may be a data entry interface whereby a user may insert or input a sequence of symbols, or extend an existing sequence of symbols, and through which a sequence of symbols may be displayed.

In one particular embodiment, text element 280 is the device by where a user may insert a sequence of symbols or extend an existing sequence. Text element 280 can send a message (EditText) to the system or semantization module 240, containing information on a possible prefix or other user input text. Text element 280 then receives a Substitute-Text message from semantization module 240 containing a sequence of symbols (S) in response to the EditText message. Text element 280 may also receive a EndEdit message, signaling the completion of the EditText message when a user has finished entering a sequence of symbols. When text element 280 receives this SubstituteText message, text element 280 may respond accordingly. If it is the first SubstituteText received since the last EditText was sent and the last EditText had a prefix, the SubstituteText argument is substituted for the sequence of symbols relative to the prefix in text element 280, which is then displayed to the user. If this is the first SubstituteText received since the last EditText was sent, and the last EditText had no prefix, text element 280 may just insert the SubstituteText argument in the sequence displayed to the user. For two consecutive SubstituteText messages without an EndEdit between them, it replaces the text of the first SubstituteText messages by the argument of the second and displays the information to the user.

Menu element 282 may present user with a series of choices or options, depending on an output or state of the system. Menu element 282 can be combined with text element 280 in certain embodiments. Menu element 282 may display a list of choices or a tree of choices, for selection by a user. Menu element 282 may receive SetMenu messages from semantization module 240 containing an argument. This argument may be a flat list of choices when the menu is a list, or an argument referring to the position of choices in a tree or a nested list of choices, in the case of a tree menu. The choices may be sequences of symbols or constants. When the user selects a choice from the list presented, a SelectItem message may be sent to semantization module 240 with the value of the choice as an argument.

Use context 290 may control properties and layouts of sensors 210, 212 and notify the user of certain events. In one embodiment, use context 290 may use a TextInputQuery to prepare text element 280 or menu element 282 for interaction with a user. Text element 280 can respond to by emitting an EditText message with a QueryFlag to semantization module 240, indicating that text element 280 is ready for editing.

Use context 290 may also be aware when text editing is performed in text element 280 through the interception of StartEdit messages when editing starts, or EditStop message when editing stops. Use context 290 may also control various properties of principle sensor 210, and notify a user of certain events.

These events are triggered through a UserNotify message which may contain information about the type of notification. The system may interpret the action to undertake for each type of notification. This interpretation may be done by semantization module 240.

Principle sensor 210 may monitor a set of variables in an environment and send the results through discrete messaging to keystroke module 220. Additionally, principle sensor 210 may be capable of detecting actions of a user, which may consist of a user designating a particular area within the range of principle sensor 210, a sequence of movements made by a user, and the user's cessation of movement. These actions usually involve direct physical contact between a user and the sensor, indirect contact through the use of a tool, such as a stylus, pen, etc. or methods not involving physical contact such as eye movements, laser pointer, etc. Those of ordinary skill in the art will realize that a wide variety of options exist for implementing principle sensor 210. Examples of these options include eye tracking systems, touch screens, joysticks, graphical user interfaces, traditional keyboards in all their electronic or mechanical forms and the like. Similarly, these sensing device(s) may be implemented in hardware, software, or a combination of the two. It will also be apparent, after reading this disclosure, that a wide variety of layouts may be utilized with principle sensor 210 to provide an interface for data entry.

Figure 3:
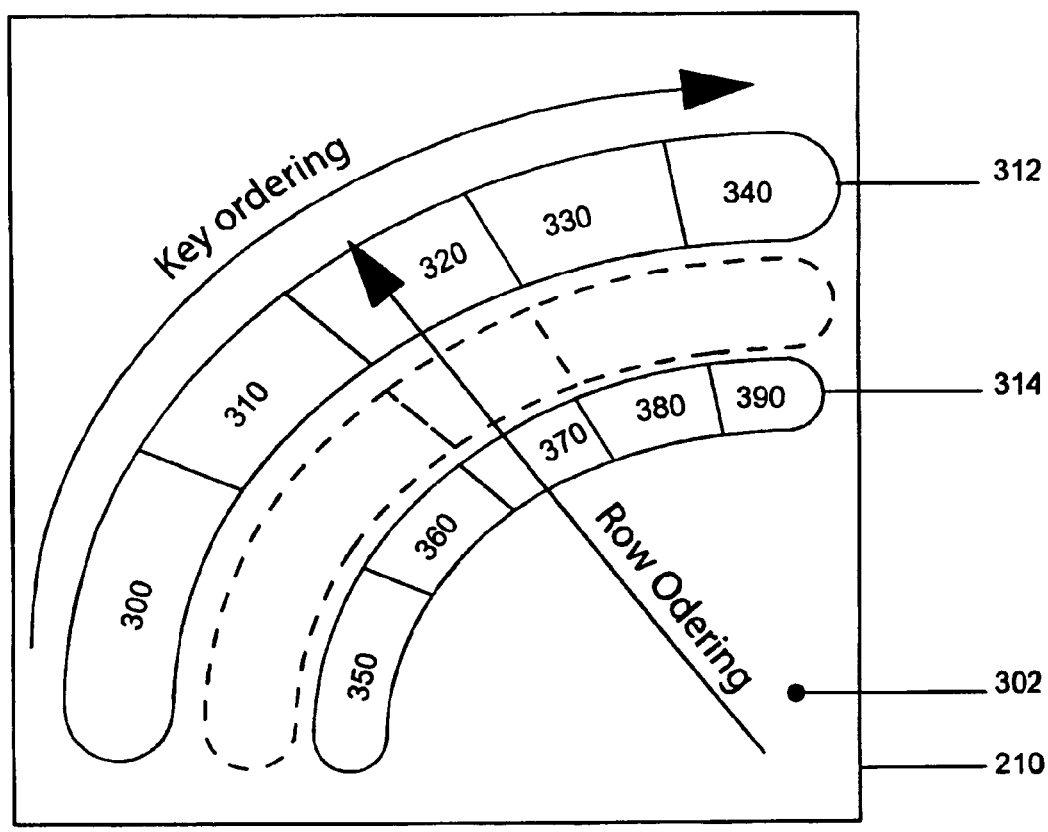
FIG. 3 includes a representation of one embodiment of a layout for employing zones with a principle sensor.

Before delving into the interaction of the components of architecture 200, one example of a layout for use with a type of principle sensor 210 which may detect contact is presented in FIG. 3. Within principle sensor 210, a set of non-overlapping zones 300-390 may be defined. These zones 300-390 may be key zones 300, 310-390 designed to aid interaction with a user. These key zones 300, 310-390 may be arranged along one or more rows 312, 314, each row containing one or more of key zones 300, 310-390 and the rows may in turn be arranged in concentric curves. The zone which lies outside of the rows 312, 314 of key zones 300, 310-390 is no key zone 302. Each key zone 300 310-390 is associated with a unique identifier, the unique identifier representing the ordering of the key zones 300, 310-390 by means of a key zone's 300, 310-390 position among the rows and between the rows.

For example, rows 312, 314 may be numbered from smallest to largest starting with the innermost row. In the example depicted in FIG. 3, row 314 would be row number 1 while row 312 would be row number 2. Key zones 300, 310-390 may also be ordered within their respective rows. In FIG. 3, numbers may be assigned to key zones 300, 310-390 from left to right, consequently zones 300, 350 may be numbered 1, zones 320, 360 number 2 and so on. Using these row and zone orderings, a unique identifier may be assembled for each zone implemented utilizing principle sensor 210. In the current example, key zone 300 would be (2,1), key zone 350 may be identified as (1,1), key zone 360 as (1,2) etc. As can be easily seen by those of ordinary skill, many schemes may be utilized to uniquely identify the set of zones 300-390 within principle sensor 210, and these zones 300-390 may be defined in a variety of topologies which may be suited to the size of a particular sensor, device, user or any other criteria.

Principle sensor 210 may monitor the environment and determine a pointed zone or contact zone where contact is being made by a user. This pointed zone may consist of only the point or location where contact is made or may consist of a defined area surrounding the location of actual contact. When contact is made, principle sensor 210 may determine if zones 300-390 overlap the pointed zone. For each zone 300-390 which overlaps the pointed zone, principle sensor 210 sends a message to keystroke logic 220. Each message may be a message which identifies the start of contact (StartContact) and the respective unique identifier for the overlapping zone 300-390. When the pointed zone is moved, and begins to overlap any other zone 300-390, a message is sent to keystroke logic 220 indicating a zone 300-390 has been entered along with the unique identifier of that zone 300-390. When the contact ceases, principle sensor 210 senses that contact has been stopped, and indicates this to keystroke module 220 (StopContact). Therefore, principle sensor can sense a start of contact, movement of this contact, and release of the contact. Messages of this type may be exchanged between principle sensor 210 and keystroke module 220 using a message of the type described above. It is to be noted that though all types of contact may be determined by principle sensor 210, messages regarding all of them may not be passed to keystroke module 220, or used in evaluating the user's contact.

Zones 300-390 may be designated as active or inactive depending on the layout of zones 300-390, the user's specification, the semantic meaning associated with zones 300-390 etc. When a zone 300-390 is designated as inactive, principle sensor 210 may not compare the area of principle sensor corresponding with the inactive zone with the pointed zone, and therefore no messages containing the inactive zone's unique identifier will be sent to keystroke logic 220. Similarly, a comparison may be made but no messages containing the inactive zone's unique identifier will be sent to keystroke logic 220.

Keystroke logic 220 may serve to differentiate series of start/stop contact messages from principle sensor 210. Keystroke logic 220 may take the messages generated from principle sensor 210 and interpret these messages to determine the row number of a key zone 300, 310-390 in which contact is being made, and the number of the key zone 300, 310-390 in the row. Additionally, a key zone 300, 310-390 may be triggered in several modes depending on the movement of a user's contact or the user's release point, and keystroke logic may also determine the mode in which a key zone 300, 310-390 is triggered. These modes may be denoted by KeyCenter, KeyLower, KeyUpper, RowLower and RowUpper. These messages may correspond to the release point of a user, in relation to where contact by a user originally began.

In one embodiment, messages from principle sensor 210 may be processed according to the following algorithm.

If the StartContact location is nokey, the keystroke module waits for the next StartContact message without any other activity.

There are two variables: Row and Key. Each can take the values: Upper, Lower and Same For each StartContact ($k_{r1,n1}$) (where r1 is the row to which the key belongs, and n1 is the key number in the row):

---

Set the Row to Same and Key to Same.
Then for each EnterZone ($k_{r2,n2}$):
    If r2>r1 set Row to Upper
    If r2<r1 set Row to Lower
    If r2=r1:
        Set Row to Same and
            If n2>n1 set Key to Upper
            If n2<n1 set Key to Lower
            If n2=n1 set Key to Same
For StopContact:
    If Row is equal to same:
        If Key is equal to Same emit Input (r1, n1, KeyCenter)
        If Key is equal to Lower emit Input (r1, n1, KeyLower)
        If Key is equal to Upper emit Input (r1, n1, KeyUpper)
        If Row is equal to lower emit Input (r1, n1, RowLower)
        If Row is equal to upper emit Input (r1, n1, RowUpper)

---

Figure 4:
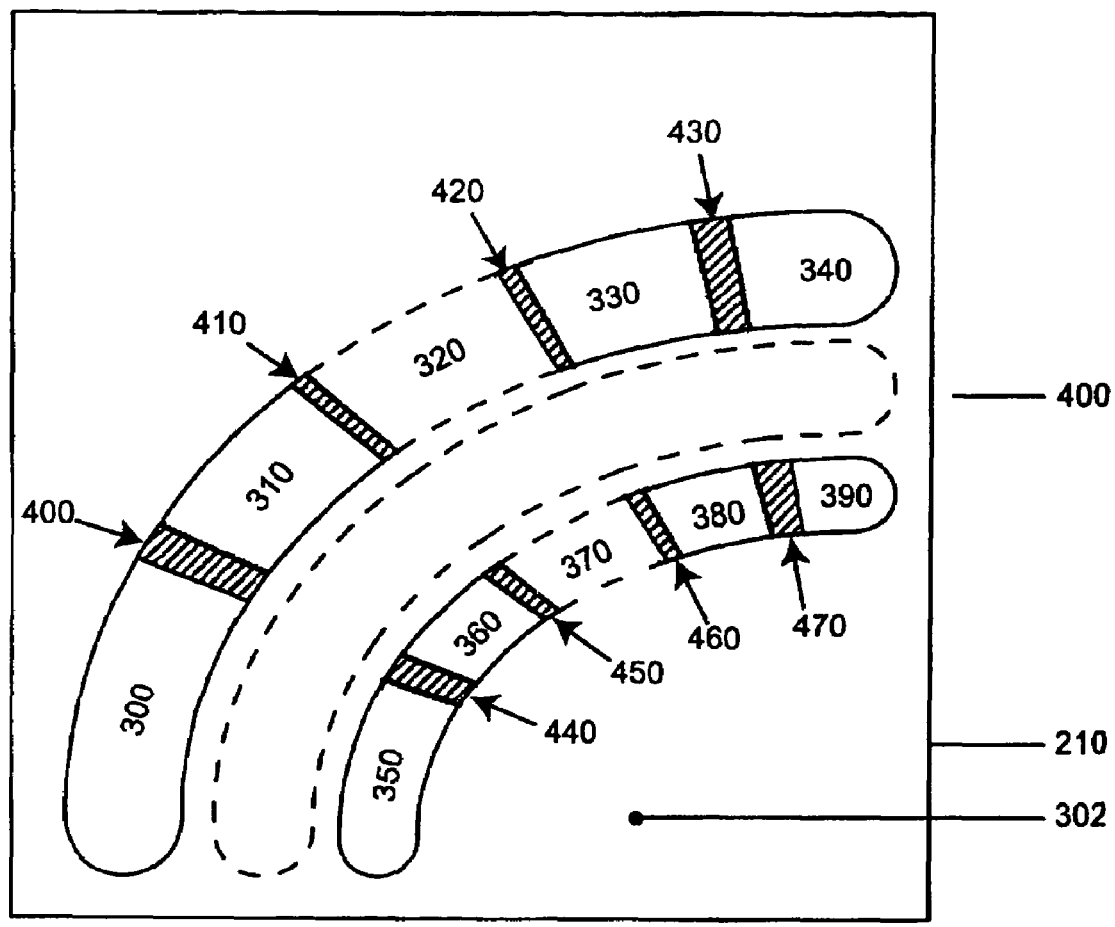
FIG. 4 includes another representation of an embodiment of a layout for employing zones with a principle sensor.

Turning now to FIG. 4, another layout for use with embodiments of principle sensor 210 is depicted. While the layout described with respect to FIG. 3 is perfectly adequate, when many zones 300-390 are present it may be difficult to determine the location of a user contact when the contact is close to the border of two zones. To remedy this difficulty, layout 400 on principle sensor 210 may include interkey zones 400-470 to implement a latching mechanism. Interkey zones 400-470 may be interleaved with key zones 300, 310-390 such that no two key zones 300, 310-390 are contiguous. These interkey zones 400-470 may also have unique identifiers, and principle sensor 210 may sense when contact takes place in an interkey zone 410-470 and send a corresponding message to keystroke logic 220. When interkey zones 400-470 are present the messages from principle sensor 210 may be processed according to the following algorithm.

The row number x is now constituted of zones with the labels: ($k_{x,1}$, $i_{x,1}$, $k_{x,2}$, $i_{x,2}$, . . . , $i_{x,y-1}$, $k_{x,y}$), where y is the number of keys of row number x. If the StartContact location is nokey or an interkey zone, the keystroke module waits for the next StartContact message without any other activity.

For each StartContact ($k_{r1,n1}$):
Set Row to Same and Key to Same
For each EnterZone ($i_{r2,n2}$)

---

If r2=r1 then
        If n2<n1-1 set Row to Same and Key to Lower
        If n1>n1 set Row to Same and Key to Upper
    If r2<r set Row to Lower
    If r2>r set Row to Upper For each EnterZone ($k_{r2,n2}$)
    If r2=r1 then
        If n2=n1 set Row to same and Key to Same
        If n2<n1 set Row to same and Key to Lower
        If n2>n1 set Row to same and Key to Upper
    If r2<r1 set Row to Lower
    If r2>r1 set Row to Upper
For the first StopContact
    If Row is equal to same
        If Key is equal to Same emit Input (r1,n1,KeyCenter)
        If Key is equal to Lower emit Input (r1,n1,LeyLower)
        If Key is equal to Upper emit Input (r1,n1,KeyUpper)
    If Row is equal to Lower emit Input (r1,n1,RowLower)
    If Row is equal to Upper emit Input (r1,n1,RowUpper)

---

It will be readily apparent to those of ordinary skill in the art that interkey zones may be employed to implement a latching mechanism between any two zones or sets of zones. For example, an interkey zone may be employed to implement a latching mechanism between rows 312, 314.

Figure 5:
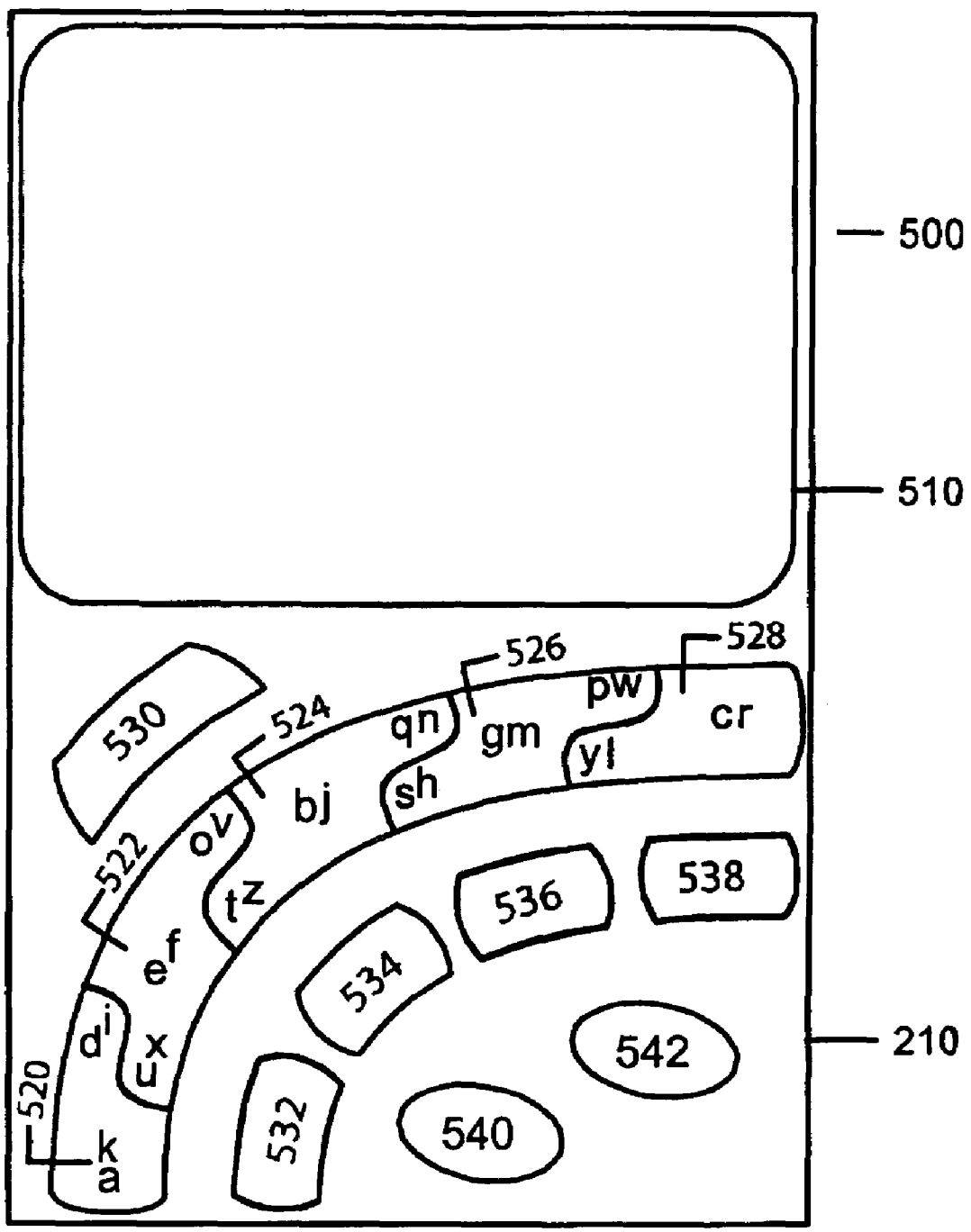
FIG. 5 represents one embodiment of a layout for employing zones for data entry on a device.

FIG. 5 a detailed layout of a user interface 500 for use with embodiments of the present invention is presented. User interface 500 may contain principle sensor 210 and text window 510 for displaying information to the user. Principle sensor 210 may contain a set of zones 520-542. Each set of zones may present a set of symbols to the user. One set of zones 520-528 may correspond to characters of the English language, while other zones 530-542 may correspond to other functions depending on the context or architecture of the system with which user interface 500 is being utilized. These other functions may include command functions or menu functions.

Figure 6:
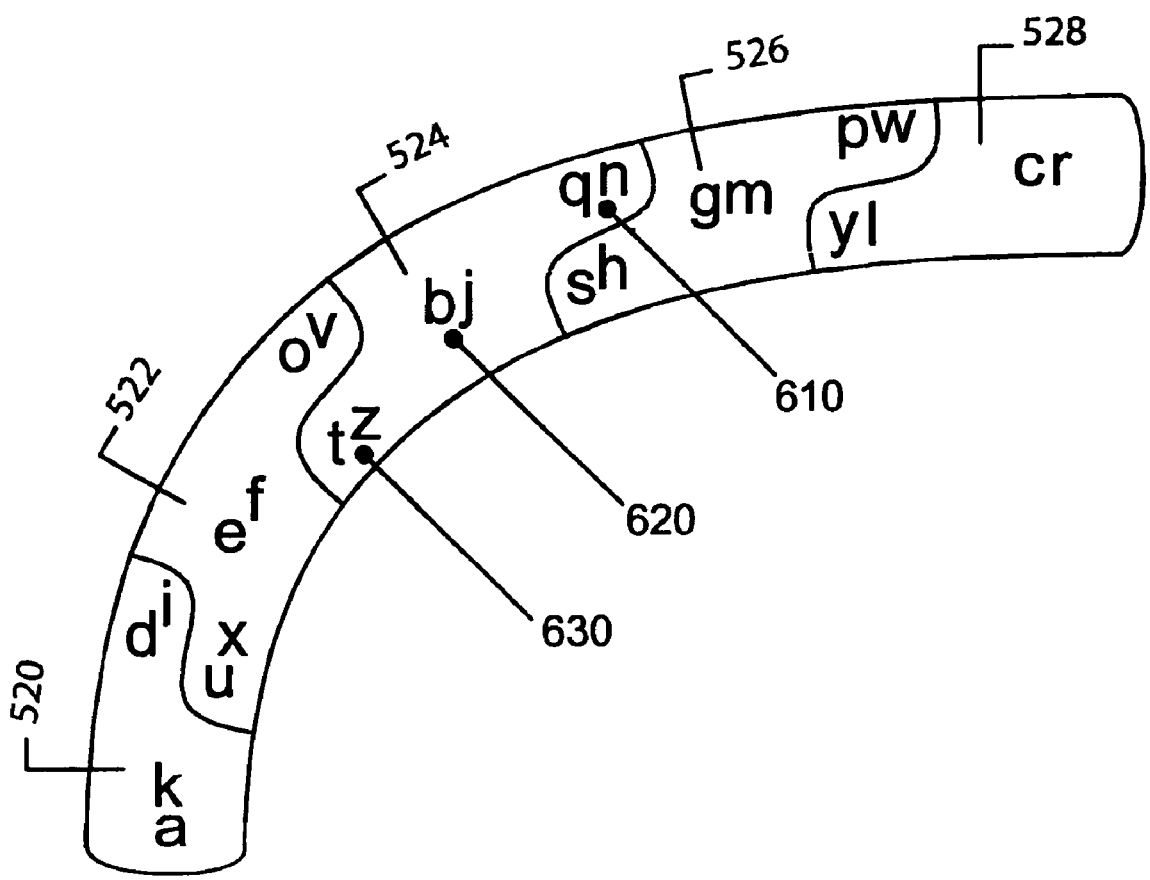
FIG. 6 represents in more detail some of the zones depicted in FIG. 5.

FIG. 6 depicts with more particularity the set of zones 520-528 which are associated with the English language. Zones 520-528 may be laid out in a curve, such that zones 520-528 may be actuated with the thumb of the hand holding the device on which user interface 500 is utilized. In the embodiment depicted, zones 520-528 are arranged so they may be more efficiently actuated by a right-handed person. However, as discussed above, the landscape of the keys may be altered to any desired format, including formats which allow efficient actuation by the left hand. Each zone 520-528 contains up to six pairs of letters, grouped by key into upper pair 610, center pair 620 and lower pair 630. A user may actuate zones 520-528, principle sensor 210 will detect this actuation, pass messages corresponding to this actuation to keystroke logic 220, which will in turn translate these message to an Input message. Semantization logic 240 will then associate this Input message with the proper pair of letters.

For example, to select center pair 620 a user may touch the zone with the desired pair and release. To select any lower pair 630 a user may touch the zone with the desired pair and slide to any zone in the direction of the pair desired, the converse is true for selecting upper pair 610. To illustrate this example further, suppose a letter of the pair (s,h) is desired. This selection may be accomplished by touching the zone 526 containing (g,m) and sliding the movement until the pair (b,j). Note that the movement may stop in any zone 520-524 below zone 526 containing the desired pair (s,h). Semantization logic 240 may still resolve this movement into the desired pair (s,h).

Semantization logic 240 may receive a message from keystroke module 220 or additional sensors 212, and translate this message to a set of symbols or a set of commands depending on the context in which the message is received. In one particular embodiment, semantization logic 240 receives an Input message from keystroke logic 220 and translates this to a set of possible of symbols in accordance with a context. For example, a user actuation as described above with regards to FIG. 6 may be resolved to the letter pair (s,h). This resolution may then be passed to core logic 250. Semantization logic 240 may also be responsible for coordinating the input and output of the system in accordance with the context of the system.

In more specific embodiments, semantization module 240 may be responsible for translation of input messages to symbols or commands. This translation may be context dependent; the part of the context needed by semantization module may be called SemantifyContext. Semantization module 240 may respond to an input message representing symbols according to the context (SemantifyContext), with a SymbolMessage containing a set of symbols.

In the case where an input message represents a command, a message (CommandMessage) is emitted containing the unique identifier of the command. This unique identifier information can take a value which corresponds to the command desired, including: BackSpaceCmd, EndLexiconCmd, ItemSelectionCmd, NextCharCmd and PrevCharCmd. If the input message represents nothing with respect to the context (SemantifyContext), no action may be taken.

An input message can represent both a command and a set of symbols, in such a case a SymbolMessage may be sent out before the CommandMessage in order to display the set of symbols. Semantization module 240 may also be responsible for configuration of sensors 210, 212.

In some embodiments, messages from text element 280, menu element 282 or user context 290 are handled as follows:

A SelectItem triggers the emission of a CommandMessage with ItemSelectionCmd as command identifier and the argument of SelectItem.

If the last EndEdit message is more recent than the last StartEdit, the reception of a StartEdit triggers an EditText message. If the last StartEdit message is more recent than the last EndEdit, the reception of an EndEdit triggers the emission of a CommandMessage to the core logic 250 with argument EndLexiconCmd.

If the semantization module 240 is about to send a SymbolMessage when the last EndEdit message is more recent than the last StartEdit, semantization module 240 suspends the sending of the SymbolMessage, sends a message TextInputQuery to user context 290. If the next message received is EditText associated with a QueryFlag, semantization module 240 forwards the EditText message to core logic 250, and sends a suspended SymbolMessage.

A SemantifyContext may be the incremental result of a ContextGeneration function called with the last received message (either from architecture components or external) and the previous SemantifyContext as arguments. Between any two messages the SemantifyContext remains consistent.

Figure 7:
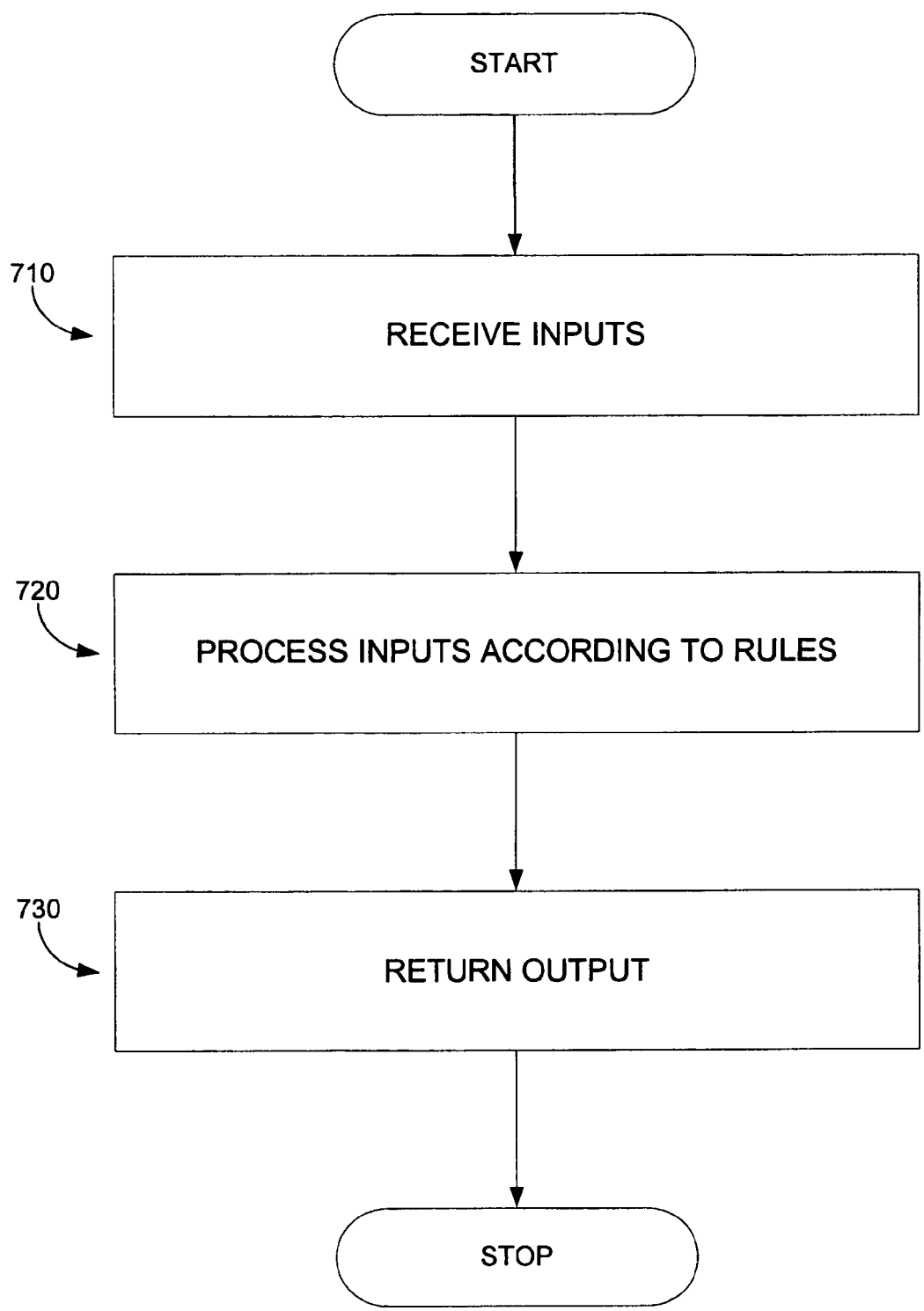
FIG. 7 includes one methodology for the processing of inputs by the core logic.

Turning now to core logic 250 employed by semantization module 240, FIG. 7 depicts the basic methodology employed by core logic 250. Core logic 250 may take a set of inputs (block 710), apply processing rules (block 720) and return output (block 730) if necessary. Core logic 250 may take a set of inputs (block 710), these inputs may be generated internally by core logic 250, or may be from a user through principle sensor 210. Inputs may also be received by core logic 250 (block 710) from semantization module 240. As described above, in certain circumstances, semantization module 240 may generate a set of messages, depending on messages it has received and the context in which it is operating. Semantization module 240 may pass these messages to core logic 250, which may in turn take these messages as a set of inputs (block 710). In some embodiments, this input may be messages representing symbols or commands. Additionally, these messages may contain a prefix and a sequence of symbols related to the prefix.

Core logic 250 may take this set of inputs (block 710) and process them (block 720) according to a specific set of rules. This processing may include the formulation of a proposition, which may be a symbol, word, arbitrary sequence of characters, or any combination. This proposition may be associated with, or derived from, the disambiguation of an input, a predictive completion or prediction, or some combination of the two.

The rules which core logic 250 uses to process the set of inputs (block 720) may be designed to utilize language model 260 and usage model 280 to produce a set of candidates or predictions, and evaluate these candidates or predictions to generate a set of propositions, one or more of which may be presented to a user. In one embodiment, core logic 250 uses a scoring system to process the input (block 720). When core logic receives an input, if the input has no prefix, one or more propositions may be generated and evaluated according to a scoring system. However, if a prefix is present a sequence may be generated by appending the new input to the prefix and attempting to generate and evaluate one or more candidates based on this sequence. If no candidates can be generated, or the candidates generated do not surpass some threshold score a method may be provided to specify an input, otherwise the candidates are evaluated, predictions made, and a proposition may be formed and presented to a user based on this evaluation. Propositions may also be formulated in light of the disambiguation of the original input.

In certain embodiments, core logic 250 may formulate a candidate based on the input, determine a prediction from one or more of the candidates and formulate a proposition to present to the user from the set of candidates and predictions generated.

In some embodiments, rules and algorithms utilized by core logic 250 may be grouped into three categories, guessing rules, unambiguous rules, and internal rules. Unambiguous and guessing rules may be the main driver for core logic 250, while the internal rules may serve as the control functionality behind core logic 250, and may provide functionality responsible for the use of the guessing and unambiguous rule sets, the evaluation of these two rule sets, or responses from these rule sets. Additionally, the internal rules may be responsible for creating a prefix or proposition to be shown to a user.

These internal rules may work in tandem with the unambiguous rules and guessing rules depending on the functionality desired and the context in which the rules are being utilized. These rules may describe the behavior of the system in various contexts, and may be employed based on user desire or internal status. The unambiguous rules may describe behavior when the input received either from the user, or from semantization module 240, is ambiguous or there is no adequate candidate. In certain embodiments, these unambiguous rules employ only language model 260. Guessing rules may describe behavior when a relevant candidate can be found, and in embodiments may employ both language model 260 and usage model 280.

In one particular embodiment, core logic module 250 receives a CommandMessage or SymbolMessage from semantization module 240. Core logic 250 responds to those messages in accordance with a set of rules. When the core logic 250 rules indicate communication with a user, the semantization module 240 is used for delivery of the corresponding messages used for interface with the user.

In this embodiment, the rest of the core logic 250 rules are organized under three headings: 1) Guessing rules, which describe the core logic 250 behavior when the system has relevant propositions about input; 2) Unambiguous rules which describe how the system behaves when an input is ambiguous and the system can guess no relevant proposition about the input; and Internal rules, which contain several functions necessary to the evaluation of the guessing in the unambiguous rules.

Each of those rules is further detailed below.

The variables common to all the rules are:

CurrentRun a sequence of symbols.

CurrentPropositionSet a set of Propositions which may be stored in a data structure, which may be represented in code as:

```
typedef struct   {
         Char*     run;
         Int       count:} Proposition;
```

InputSeqs is set sequence of set symbols.

EditionState can take two values: GuessingState and UnambiguousState.

FinalSeq is a sequence of symbols or Undefined.

CurrentSym is an integer.

When the core logic 250 receives an EditText message, it responds by:

Sending a StartEdit message to the text element.

```
If EditText prefix is empty then
     CurrentPropositionSet is set to an empty set;
     InputSeqs is set to an empty set;
     The rule ShowPropositions is evaluated;
Else
     NewPrefix is evaluated with argument the EditText
     prefix;
     if CurrentPropositionSet is empty
         EditionState is set to UnambiguousState;
         InitUnambiguous is evaluated;
     Else
         rule ShowPropositions is evaluated;
```

This algorithm initializes the state of core logic 250 for new input. The initiation is simple if there is no prefix. When a prefix is provided, the algorithm is designed to attempt to lookup the longest partial string being a possible completion of the prefix, utilizing language model 260. If language model 260 does not contain such a partial string, the algorithm switches to an unambiguous input mode.

i. Guessing Rules

The guessing rules apply when EditionState=GuessingState. This section of rules has a unique constant Add. There is a rule for each type of message arriving to core logic 250:

```
SymbolMessage has as list of symbols S= (S_1,. . .,S_t) with
t≧1
  set InputSeqs to the concatenation of InputSeqs
  and (S)
  if CurrentRun is not empty, evaluate
  newPrefix(CurrentRun) and set CurrentRun to empty
  if CurrentPropositionSet is empty
     EditionState is set to UnambiguousState;
     Initunambiguous is evaluated;
  Else
     If CurrentPropositionSet is empty then:
     L is the maximal set of non-identical
     elements of type Node {L_1,. . .,Ln} where
     for each i part of {1,. . .,n}:
       L_i.c=S_j with j part of {1,. . .,t}
       IsInSubtree (L_i.location, root)
     P is the minimal set of proposition (P_1,. . .,P_m)
     such as each i part of {1,. . .,m}:
       P_i.run=(L_i.c) and P_i.count=L_i.count
     PF=FilterProposition (P)
     If PF is empty then:
       set the EditionState to
       UnambiguousState
       evaluate InitUnambiguous
     else:
       set CurrentPropositionSet to PF
       evaluate ShowPropositions
       emit a UserNotify message with click
       as argument.
  else:
     The currentProposiontSet is the set {CP_1,. . .,CP_m}.
     TempLocationSet is the maximal set of not
     identical Node elements
     {(L_1,X_1,Y_1,Count_1),. . .,(L_n,X_n,Y_n,Count_n) } where for
     each i part of {1,. . .,n}:
       L_i.c=S_j where j part of {1,. . .,t}
       Y_i is CP_j with j in {1,m}
       X_i is the longest sequence of Node
       (N_1,. . .,N_m) where:
          (N_1.c,. . .,N_m.c) forms a suffix not null
          of Y_i.run
          IsInSubtree (N_1,root)
          IsInSubtree (L_i,N_m)
          Count_i=ExtendProposition (L_i,CP_j. count)
     PF is the sequence of propositions (PFP_1,. . .,PFP_n)
     where for each i in {1,. . .,n}:
       PFP_i.run is equal to the concatenation of
       Y_i.run and L_i.c
     PF2=FilterProposition(PF)
     if PF2 is empty then:
       set the EditionState to UnambiguousState
       evaluate InitUnambiguous
     else
       CurrentPropositionSet is to the set PF2
       where for each i in {1,. . .,n}:
       evaluate ShowPropositions
       emit a UserNotify message with click as
       argument.
```

Note: These rules for SymbolMessage may process user input, and try to find out which symbol sequence the user wants to input based on all the information received since the last EditText message, regardless of whether the user input is ambiguous or not.

```
CommandMessage
Depending on the command identifier contained in the
message, the following actions are taken:
     BackSpaceCmd.
     If InputSeqs is an empty sequence
         an EditStop message is sent to the UseContext
```

-continued

```
else
    Replay is the sequence
    (EditText () ,SymbolMessage(S_1),. . .,
    SymbolMessage (S_{n-2})) along the input sequence
    (S_1,. . .,S_n). CurrentPropositionSet and InputSeqs
    are set to empty sets. The CoreLogic sends only
    to itself one after the other the elements of
    Replay as an argument of SymbolMessage and
    prevents himself to emit messages to other
    modules. Finally a SymbolMessage (S_{n-1}) is sent.
```

Note: These rules may make core logic 250 return to the state it was in before the last undiscarded SymbolMessage occurred.

```
EndLexiconCmd
    If CurrentRun is equal to Add
        Set the EditionState to UnambiguousState.
        Evaluate InitUnambiguous
    Else
        if CurrentRun is empty and
        CurrentPropositionSet is of the form (P,. . .) set
        CurrentRun to P.run
        Send a SubstituteText with argument CurrentRun
        An EditEnd message is send to the user context
        and to the Semantization module.
        Evaluate the StoreWord rule with as argument
        Current Run
```

Note: If the user had selected a suggestion (Add) in the menu this rules switches core logic 250 rules to unambiguous mode else this rule cleans up the environment and takes account of the symbol sequence composed since the last StartEdit by the user.

```
ItemSelectionCmd
If the highlighted item in menu is the command Add
then:
        Set CurrentRun to Add
        Send a SubstituteText with argument P.c , while
        CurrentPropositionSet is (P . . .)
Else:
        Set the CurrentRun to the argument of
        PropositionSelect
        Send a SubstituteText message with the
        CurrentRun to the text field.
        Evaluate ShowRules
        Note: The user may select one of the propositions
        as the input he wants to appear in the
        TextElement.
```

Unambiguous Rules

The rules indexed under Guessing rules apply when EditionState=UnambiguousState.

```
InitUnambiguous
    Emit UserNotification (Error)
    set CurrentSym to 1
    InputSeqs has the form (S_1,. . .,S_n), set FinalSeq to
    a sequence of n elements
        Undefined
    evaluate ShowUnambiguous
    send StartAmbiguousInput to the Semantify module
SymbolMessage
    has as sequence S as argument
    The InputSeqs has the form (S_1,. . .,S_n), set
    InputSeqs to the sequence (S_1,. . .,S_n, S)
    The FinalSeq has the form (F1,. . .,Fn), set FinalSeq
    to the sequence (F1,. . ., Fn,Undefined)
    evaluate ShowUnambiguous
CommandMessage
    BackSpaceCmd
        If InputSeqs is of the form (S) :
            Send SubstituteText with as argument an empty
            sequence.
            Send an EditEnd message to the user context and
            to the Semantify module.
    Else:
            InputSeqs is of the form (S_1,. . ., S_n), set
            InputSeqs to (S_1,. . .,S_{n-1})
            FinalSeq is of the form (F_1,. . ., F_n), set FinalSeq
            to (F_1,. . ., F_{n-1})
    EndLexiconCmd
        send a SubstituteText message with the
        CurrentRun to the text field
        An EditEnd message is send to the user context
        and to the Semantify module.
        evaluate the StoreWord rule with as argument
        Current Run
    ItemSelectionCmd
        has as argument A.
        If A is equal to Done
            send a SubstituteText message with the
            CurrentRun to the text field
            An EditEnd message is send to the user
            context and to the Semantify module.
            evaluate the StoreWord rule with as
            argument CurrentRun
        Else:
            FinalSeq of the form (F_1,. . ., F_{CurrentSym + 1},
            F_{CurrentSym}, F_{CurrentSym+1},. . ., Fn) is set to (F1,
            . . ., F_{CurrentSym-1}, A, F_{CurrentSym+1},. . ., Fn)
            set CurrentSym to CurrentSym+1
            Evaluate ShowUnambiguous
    PrevCharCmd
        if CurrentSym=1 emit UserNotify(Error) else
    Current Sym=CurrenSym-1
    NextCharCmd
        if CurrentSym note equal to the length of
        InputSeq emit UserNotify(Error) else
        CurrentSym=CurrenSym+1
``` iii Internal Rules

The rules described in this section are explicitly called when evaluating "Unambiguous Rules" and "Guessing Rules"

```
ShowUnambiguous
InputSeq is of the form
((S_{1,1},. . .,S_{1,M(1)}),. . ., (S_{n,1},. . ., S_{n,M(n)})) where M(x) is the
function that gives the length of x^{th} element of
InputSeq. FinalSeq is of the form (F_1,. . .,F_n) where each
Fi is equal to Undefined or one of the elements of
S_{i,1},. . .,S_{i,M(i)}) C is one of the sequences (C_1,. . .,C_n)
where for i in {1,. . .,n}:
        If F_i ≠ Undefined then C_i=F_i else Ci in
        (S_{i,1},. . ., S_{i,M(1)})
        Quotation_n maximal such:
            If Ci=L.c with IsInSubtree(L,root)
            Quotation_1=L.count else Quotation_1=0
            I in {2,. . ., n} Quotation_n=Accumulate (Quotation_{i-1},
            L.count) where L=NodeFromPath (C_{i-j},. . ., C_i) with J
            maximal
set CurrentRun to c
Send MenuSet message with argument
(S_{CurrentSym,1},. . ., S_{CurrenSym,M(1)},Done)
```

Accumulate and Invariant may be defined in an implementation dependent manner, which will be apparent to those of skill in the are after reading this disclosure.

```
NewPrefix
Has as argument s = (C₁ . . . C_r)
    Set InputSeqs to the sequence ({C₁},. . .,{C_r})
    P is the proposition such as:
        p.run= s, p.count =Invariant
        The longest sequence of (N₁,. . ., N_m) where:
            IsInSubtree (N_i,N_{i+1}) with i in [1, m−1]
            N_m=root
            For each N_i with i in [1,m−1], N_i. c=C_{r−m+i}
    If P exists
    Set CurrenPropositionSet to FilterProposition({P})
    Else
    Set CurrentPropositionSet to empty
```

ShowPropositions rule
CurrentPropositionSet is of the form $\{P_1, \ldots, P_n\}$
UP is the set where for i in $\{1, \ldots, n\}$:

```
the sequence PredA
((PrA₁,CA₁,SymA₁),. . ., (PrA_m,CA_m,SymA_m)) is equal to
GetSugestions (P_i.run)
the sequence PredB the minimal sequence
((PrB₁,CB₁,SymB₁) ,. . ., (PrB_k,CB_k,SymB_k)) with:
    for each j in {1,. . ., k−1} CB_j ≧ CB_{j+1}
    for each j in {1,. . ., m} if Relevant(PrA_j )
    Adjust((PrA_j,CA_j, SymAj) is part of PredB
U is equal to GetUNodeFromPath(Pi.run)
if U is equal to UnknownPath then
    ((P_{i.run, Pi}·c)) is part of UP
else
    (Adjust((P_i.run, P_i.c,U)), (PrB₁,CB₁,SymB₁),. . ..
    (PrB_k,CB_k,SymB₁)) is part of UP
if the menu is capable of showing a tree send SetMenu
message with argument FilterSortExtentions(U), else:
    U is of the form (((DS,DC) ((PS,PC) ((SS,SC) . . .) . . .) . . .)
    U2 is the minimal list made of all the elements
    (DS,DC), (PS,PC) and (SS,SC) from U sorted along
    the DC,PC,SC
    send SetMenu message with argument U2
```

Note: These rules may show the user all the relevant propositions currently evaluated for the disambiguisation/prediction for his input.

Adjust is implementation dependent and may relate the probabilities of predictions with the probabilities of the disambiguation propositions. This assures the user input is on average minimal.

ExtendProposition and FilterProposition are functions which may be implementation dependent. Filter Proposition may adjusts the threshold scoring level which determines the suggestion which are shown to the user must be. A higher threshold lowers the number of irrelevancies in the suggestions shown to the user.

StoreWord is also implementation dependent, and may be a holding place for a set of characters and may manage the amount of resources allocated to the LanguageModel and UsageModel structure. It may also control the models adaptation to the user's behavior to improver prediction/disambiguation for future use.

Figure 8:
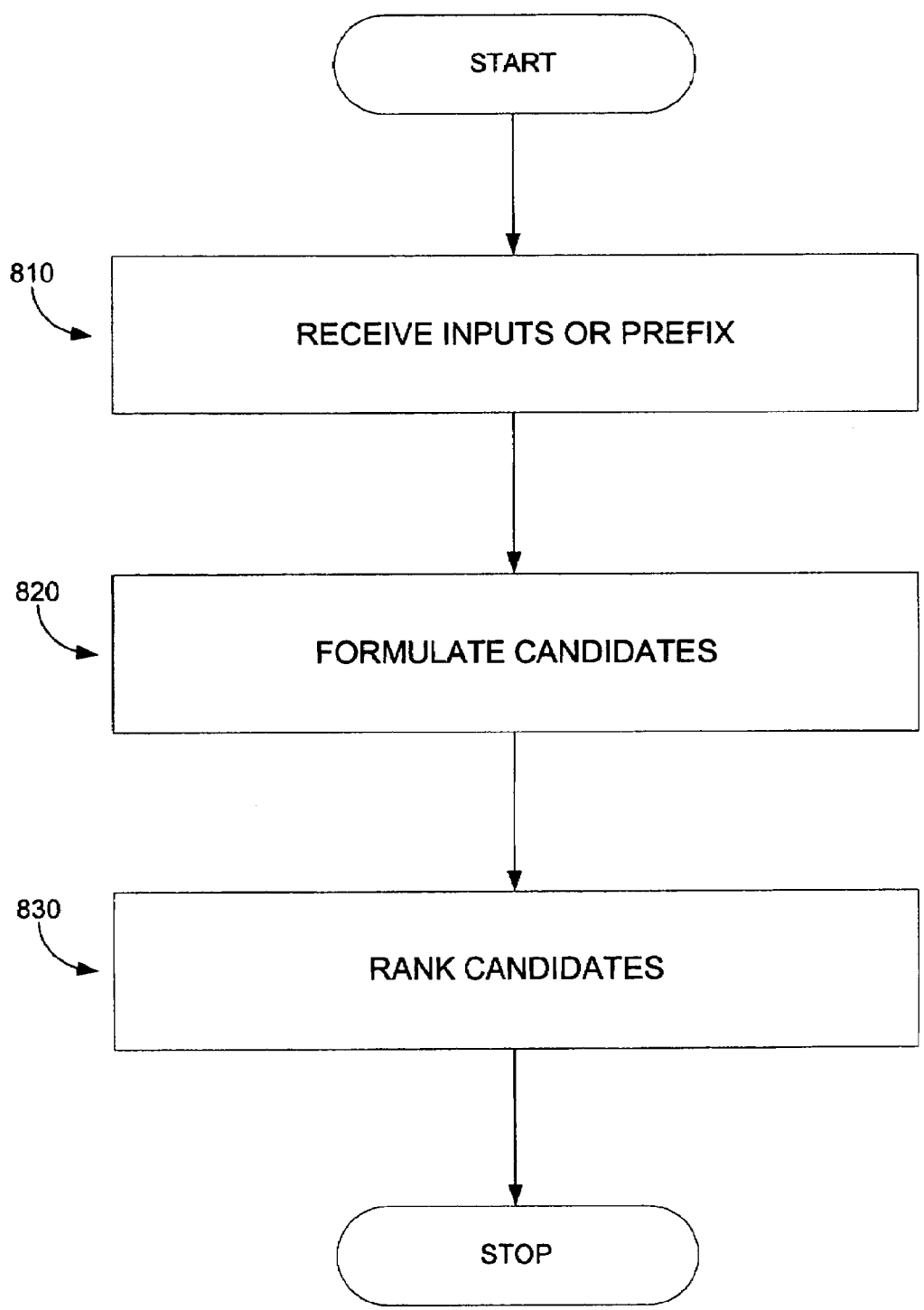
FIG. 8 includes one methodology for formulating candidates which may be used by the core logic during the processing of inputs.

Moving on to FIG. 8, one embodiment of a method for which core logic 250 may utilize language model 260 is depicted. Language model 260 may be an extension and improvement of the model depicted in an article by J. G. Cleary and J. H. Witten titled "Data Compression Using Adaptive Coding and Partial String Matching" published in Volume Com-32, Number 4 of the April 1984 issue of the IEEE Communications journal [Cleary1], incorporated fully herein by reference. Core logic 250 may employ language model 260 to receive a prefix or an input (block 810), formulate a set of candidates (block 820) and rank the set of candidates (block 830). Core logic 250 may receive a prefix and an input. A prefix may be an arbitrarily long set of symbols including an empty set, while an input may be an Input message of the type described with regard to semantization module 240. A set of candidates is then calculated (block 820) based on the prefix and the input. If the prefix is empty a candidate may be calculated, based solely on the input. If, however, the prefix is not an empty set, core logic 250 may attempt to lookup a set of string associated with the prefix and generate candidates (block 820) based on the prefix.

In some embodiments, core logic 250 may formulate these candidates (block 820) using language model 260, which may employ a tree structure to store arbitrarily long partial strings, and associated scores. In one embodiment, core logic 250 finds the longest string in language model 260 which is associated with the prefix. In associated embodiments, core logic 250 may use language model 260 to generate a list of candidates, this list may be a flat list or a nested list, depending on the implementation. Core logic may determine the score to associate with a candidate based on the score associated with each node of the tree implemented in language model 260. These scores may in turn be based on a probabilistic model.

It will be readily apparent to those of ordinary skill in the art that a wide variety of algorithms that may be used to calculate scores, and score candidates. For example, suppose the user wishes to enter the word "test". Using the layout described in FIG. 6, a user may select the pair (t,z), core logic 250 may then calculate the probability of "t" and the probability of "z". Next, the user will select the pair (e,f). Core logic 250 may use language model to calculate the score of the letters "e" and "f" following each of the letters associated with the set of previous candidates (t,z), and multiply it times the probability of each letter in the initial letter pair (t,z). In this manner, the probability of each sequence of two letters may be calculated.

In one particular embodiment, the structure for storing language model 260 of this type, and associated logic for processing input and calculating probabilities may be implemented as follows.

Language model 260 may be contained in structures of type LanguageModel represented as:

```
Typdef struct{
    Char          c;
    Int           counter;
    NodeStruct*   next;
    NodeStruct*   subtree;}NodeStruct
Typedef NodeStruct* Node;
Node root;
```

The Node structure may, in embodiments, be the structure of [Cleary1], modulo the syntax. Root may be core logic's entry point to language model 260.

The following properties and algorithms may be defined over the structure which supports language model 260:

```
IsInSubtree(Node N_2, Node N_1)
    If N_1.subtree is an invalid reference then
        IsInSubtree(N_2,N_1) is false
    else
        If N_2=N_1.subtree then
            IsInSubtree(N_2,N_1) is true
        Else
            IsInSubtree(N_2,N_1)=IsNeighbor(N_2,N_1.subtr
    ee)
```

Note: This property is true when $N_2$ is a son of $N_1$ and false in other cases

```
IsNeighbor(Node N_2, Node N_1)
    If N1.next is an invalid reference to a node then
        IsNeighbor(N_2,N_1) is false
    Else
    If N_2=N_1.next then
        IsNeighbor(N_2,N_1) is true
    Else
        IsNeighbor(N_2,N_1)=IsNeighbor(N_2,N_1.next)
```

Note: This property is true when $N_2$ is on the same level as $N_1$ in the tree and false in other cases

```
NodeFromPath((S_1,...,S_n))
    For each i in {1,...,n} S_i is a symbol
    N is the sequence of nodes (N_1,...,N_n) where:
        for each i in {1,...,n} N_i.c=S_i
        for each i in {1,...,n} IsInSubtree(N_{i+1},N_i) is
        true
    IsInSubtree (N_1,root)
    if N exists NodeFromPath((S_1,...,S_n)) sets values to
    N_n else it sets values to UnknownPath
```

Figure 9:
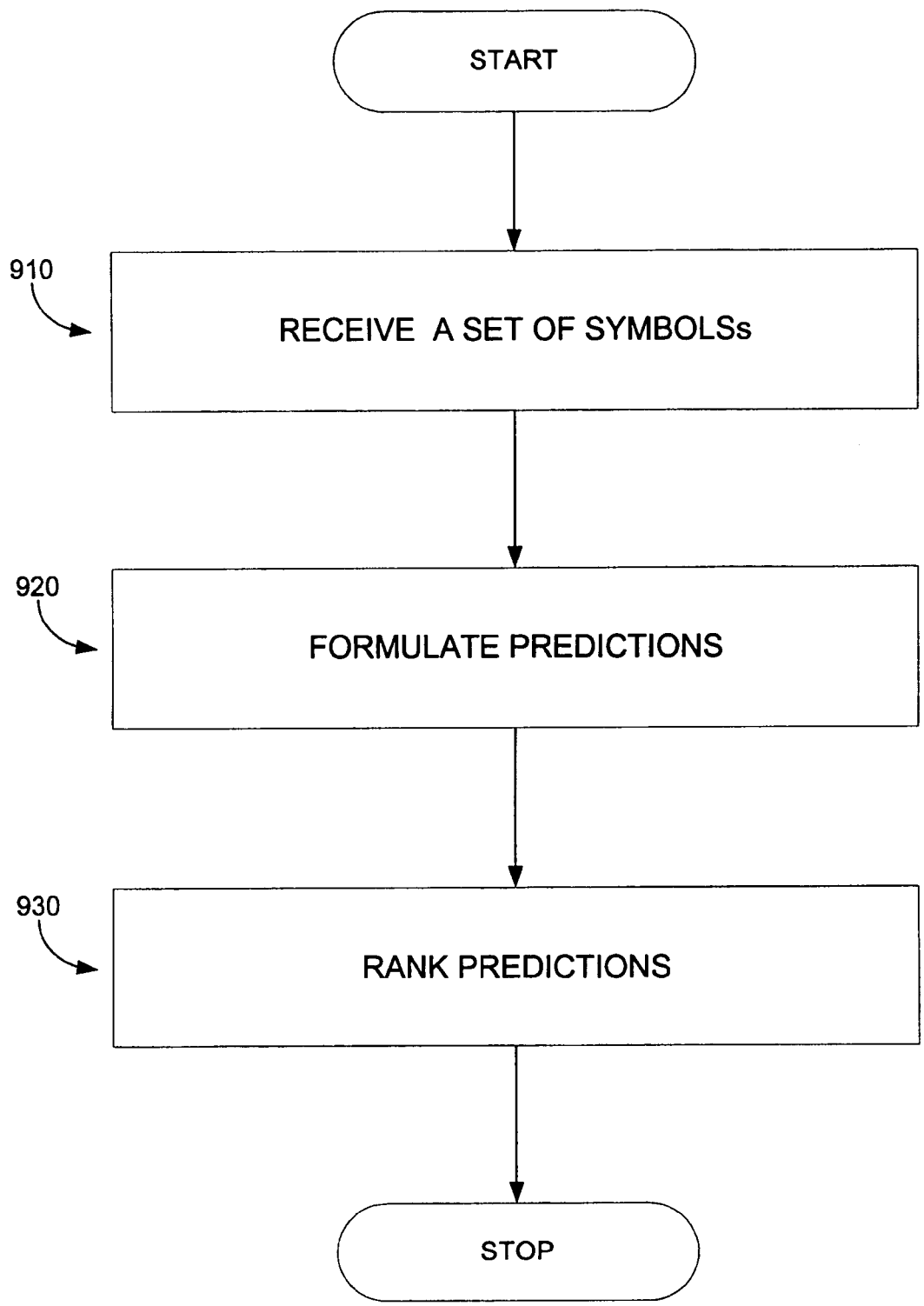
FIG. 9 includes one methodology of formulating predictions which may be used by the core logic.

FIG. 9 depicts one embodiment of a method for which core logic 250 may utilize usage model 280. Core logic 250 may employ usage model 280 to receive a set of string (block 910), formulate a set of predictions (block 920) and rank the set of predictions (block 930). Core logic 250 may receive a set of symbols (block 910) which may consist of a set of strings, these strings may be a prefix and an input from a user. In some embodiments, these symbols may be derived or extracted by core logic 250 from a set of candidates assembled by, or returned to, core logic using language model 260.

This set of strings may be then be used to formulate a set of predictions (block 820) based on a string from the set of strings. Usage model 280 may determine a series of possible completions to the string based on statistical ordering of the possible completions.

In one embodiment, usage model 280 may use a tree structure to represent words, with each node of a tree containing a character. Each node which may designate the end of word may be demarcated, and a score associated with such a terminal node. It will be readily apparent to those of ordinary skill in the art the variety of scoring systems which may be used to assign a score.

Figure 10:
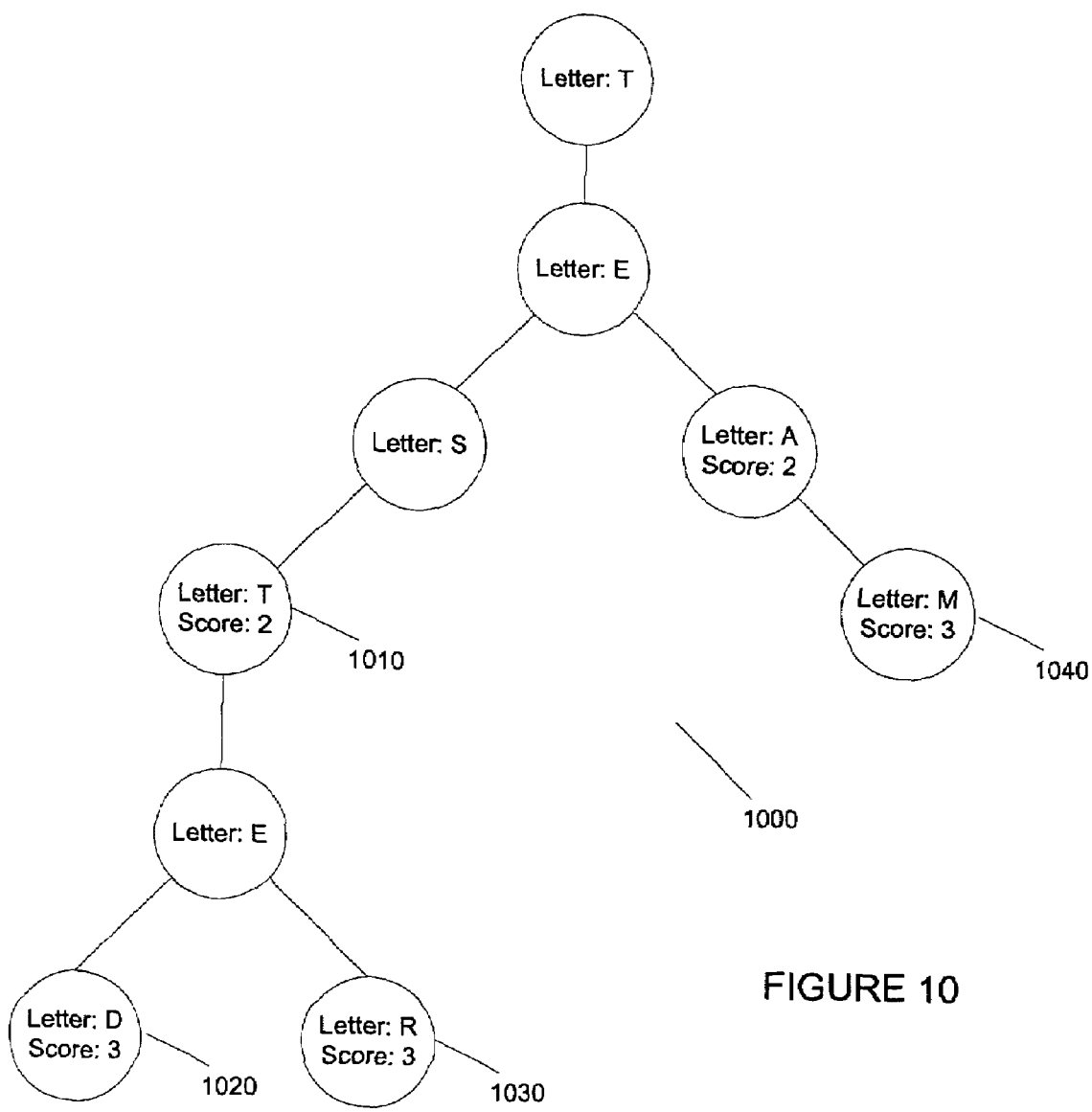
FIG. 10 includes a representation of an embodiment of a data structure for storing a language model.

To continue with the above example, suppose the string "te" is received by usage model 280. FIG. 10 depicts one representation of a tree which usage model 280 may use to complete the string. The string "te" may be used as index into a tree based representation of words 1000 which begin with "te", this tree 1000 may have terminal nodes 1010, 1020, 1030, 1040 which may contain indicia that these nodes offer possible completions to the string "te". This indicia may be a score associated terminal nodes 1010, 1020, 1030, 1040, or on some embodiments a boolean value. This score may be based on the number of nodes of the same depth which may complete the same string. The score may also be based on how many nodes in the same branch are not a completion for the string.

Based on the score associated with a node the node may be ranked (block 830) and the sequence of characters associated with each node in the path through tree 1000 to the node with the highest (or lowest) ranking may be returned. Referring to FIG. 10, if node 1020 has the highest score the sequence of characters "tested" may be returned. In other embodiments, each sequence of characters associated with terminal nodes in paths through the subtree may be returned along with the score of the associated terminal node.

Similarly, synonyms of the predictions, may be returned along with their associated scores. For example, in FIG. 10 if node 1020 has the highest score the sequence of characters "tested" may be returned. Additionally one or more synonyms may be returned. These synonyms may be determined based on their associated scores, and may be returned with or without these associated scores. The synonyms associated with a particular prediction may be stored in the terminal node corresponding to a prediction. To continue the example, terminal node 1020 corresponding to the prediction "tested" may store a variety of synonyms of "tested" including "tester", "testes", "tesla" etc. These synonyms of "tested" may be returned along with the sequence of symbols corresponding to the prediction "tested". In one particular embodiment, the structure for storing usage model 280 of this type, and associated logic for processing input and calculating scores or probabilities may be implemented as follows.

```
Typedef enum{true, false} Boolean;
Typedef struct {
    Char*           s;
    Int             count;
} SymListNode
Typedef struct {
    Char            c;
    Unode[ ]        sons;
    Boolean         terminal;
    Int             heads;
    Int             count;
    SymListNode[ ]  sym;
    {Unode
uNode* Uroot;
```

Uroot may be the entry point for core logic 250 into usage model 280. The following properties over usage model 280 may be defined:

```
IsSon(U_1:UPNode,U_2:UPNode)
    Is true if U_1 part if U_2.sons else
    IsSon(U_1,U_2) is false
```

Note: IsSon denotes if $U_1$ is a direct son of $U_2$

```
GetUNodeFromPath((C_1,...,C_n))
    The sequence (UP_1,...,UP_N):
        IsSon(UP_1,URoot) is true
        for each i in {1,...,n-1} IsSon(UP_{i+1},UP_i)
        is true
        for each i in {1,...,n} UP_i.c=C_i
```

-continued

```
If UP_n exists GetUNodeFromPath((C_1,. . .,C_n))
  values to UP_n else values to UnknownPath
```

Note: GetUpFromPath returns the UNode in the
UsageModel associated with the sequence given as
argument if it exists, else the constant UnknownPath
is return.

```
GetSuggestions(C)
  C is a sequence of symbols
  UP is the result of GetUPFromPath(C)
  UPS is the minimal set of UPNodes
  (UPS_1,. . .,UPS_n) where for each i in {1,. . .,n}:
    there is a sequence (T_1,. . .,T_q) where:
      T_1 is equal to UP
      T_q is equal to UPS_i q>1
      for each j in {1,. . .,q-1}
        IsSon(T_j+1,T_j)
    UPS_i.terminal is true
  S is the sequence
  ((S_1,Count_1,Sym_1),. . .,(S_n,Count_n,Sym_1)) where for
  each i in {1,. . .,n}: UPS_x=GetUPFromPath(S_i) ,
  UPS_x. count=Count_j and Sym_j=UPS_x. sym
  GetSugestion(C) values to S
```

Note: GetSuggestions retrieves words and their synonyms of a given prefix. Each word and synonym is associated with a score denoting their frequency of use in usage model 280.

Returning to FIG. 7, core logic may then formulate an output (block 730) based upon the processing of the input (block 720) discussed above. This output may be a sequence of characters or a sequence of characters with a set of menu options. This output (block 730) may then be presented to a user for further interaction. In one embodiment, core logic 250 may interact with semantization module 240 in order to present the formulated output (block 730) as a proposition to a user.

Note that not all of the tables, fields, or steps described are necessary, that tables, fields or steps may not be required, and that further tables, fields or steps may be added in addition to those illustrated. Additionally, the order in which each of the activities is listed is not necessarily the order in which they are performed. After reading this specification, a person of ordinary skill in the art will be capable of determining which tables, fields and orderings best suit any particular objective.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for efficient text input, comprising:
   formulating a plurality of candidates based on a prefix and an input, wherein each candidate comprises a set of symbols and a score, the score calculated based upon one of a plurality of symbols associated with the input and the prefix, and the set of symbols associated with the candidate corresponds to the prefix and the one of the plurality of symbols associated with the input;
   formulating a set of predictions based on the set of symbols associated with the candidate with a first highest score, wherein the prediction comprises one or more predictive completions associated with the set of symbols of the candidate and each of the set of predictions is associated with a score;
   formulating a proposition based on the candidate or the prediction; and
   presenting the proposition to a user.

2. The method of claim 1, wherein the prefix is empty, entered by a user, or a previous proposition.

3. The method of claim 1, wherein the score of the candidate is based on a score of the prefix concatenated with the input.

4. The method of claim 3, wherein the score of the candidate is based on a score of the input combined with the score of the prefix.

5. The method of claim 4, wherein the candidate is one of a set of candidates where the score of each of the candidates in the set is above a threshold.

6. The method of claim 5, wherein formulating a candidate further comprises ranking the set of candidates based upon the score of each of the candidates.

7. The method of claim 6, wherein formulating a candidate is based on a language model.

8. The method of claim 7, wherein the score of the candidate is based on a string which is the longest string in the language model which is a extension of the prefix.

9. The method of claim 1, wherein the prediction is one of a set of predictions.

10. The method of claim 9, wherein formulating a prediction is based on a usage model.

11. The method of claim 10, wherein each of the set of predictions is a sequence corresponding to a path through a tree starting from a node based on the candidate and ending with a terminal node.

12. The method of claim 11, wherein formulating a prediction comprises scoring each of the predictions based on frequency of appearance, length of the path through the tree, or the candidate.

13. The method of claim 9, further comprising determining a set of synonyms for the prediction.

14. The method of claim 13, wherein the set of synonyms is based on the terminal node of the prediction in the tree.

15. The method of claim 14, wherein the set of synonyms is stored in the terminal node.

16. The method of claim 14, further comprising scoring each of the set of synonyms based on a score of the prediction and the score of the candidate on which each synonym is based.

17. The method of claim 16, further comprising ranking the set of synonyms.

18. The method of claim 17, further comprising storing the set of synonyms, the set of predictions and a set of candidates, wherein the set synonyms, the set of candidates, and the set of predictions are ranked.

19. A computer readable medium having code for efficient text input, wherein the code is embodied within computer readable medium, the code comprising instructions translatable for:
  formulating a plurality of candidates based on a prefix and an input, wherein each candidate comprises a set of symbols and a score, the score calculated based upon one of a plurality of symbols associated with the input and the prefix, and the set of symbols associated with the candidate corresponds to the prefix and the one of the plurality of symbols associated with the input;
  formulating a set of predictions based on the set of symbols associated with the candidate with a first highest score, wherein the prediction comprises one or more predictive completions associated with the set of symbols of the candidate and each of the set of predictions is associated with a score;
  formulating a proposition based on the candidate or the prediction; and
  presenting the proposition to a user.

20. The computer readable medium of claim 19, wherein the prefix is empty, entered by a user, or a previous proposition.

21. The computer readable medium of claim 19, wherein the score of the candidate is based on a score of the prefix concatenated with the input.

22. The computer readable medium of claim 21, wherein the score of the candidate is based on a score of the input combined with the score of the prefix.

23. The computer readable medium of claim 22, wherein the candidate is one of a set of candidates where the score of each of the candidates in the set is above a threshold.

24. The computer readable medium of claim 23, wherein formulating a candidate further comprises ranking the set of candidates based upon the score of each of the candidates.

25. The computer readable medium of claim 24, wherein formulating a candidate is based on a language model.

26. The computer readable medium of claim 25, wherein the score of the candidate is based on a string which is the longest string in the language model which is a extension of the prefix.

27. The computer readable medium of claim 19, wherein the prediction is one of a set of predictions.

28. The computer readable medium of claim 27, wherein formulating a prediction is based on a usage model.

29. The computer readable medium of claim 28, wherein each of the set of predictions is a sequence corresponding to a path through a tree starting from a node based on the candidate and ending with a terminal node.

30. The computer readable medium of claim 29, wherein formulating a prediction comprises scoring each of the predictions based on frequency of appearance, length of the path through the tree, or the candidate.

31. The computer readable medium of claim 27, further comprising instructions for determining a set of synonyms for the prediction.

32. The computer readable medium of claim 31, wherein the set of synonyms is based on the terminal node of the prediction in the tree.

33. The computer readable medium of claim 32, wherein the set of synonyms is stored in the terminal node.

34. The computer readable medium of claim 32, further comprising instructions for scoring each of the set of synonyms based on a score of the prediction and the score of the candidate on which each synonym is based.

35. The computer readable medium of claim 34, further comprising instructions for ranking the set of synonyms.

36. The computer readable medium of claim 35, further comprising instructions for storing the set of synonyms, the set of predictions and a set of candidates, wherein the set of synonyms, the set of candidates, and the set of predictions are ranked.

37. A system for efficient multilingual text input, comprising:
  a device comprising:
  an input means comprising a set of zones, each zone associated with a plurality of symbols; and
  a processor operable to execute instructions on a computer readable medium, the instruction operable for:
    formulating a plurality of candidates based on a prefix and an input associated with one of the set of zones, wherein each candidate comprises a set of symbols and a score, the score calculated based upon one of a plurality of symbols associated with the input and the prefix, and the set of symbols associated with the candidate corresponds to the prefix and the one of the plurality of symbols associated with the input;
    formulating a set of predictions based on the set of symbols associated with the candidate with a first highest score, wherein the prediction comprises one or more predictive completions associated with the set of symbols of the candidate and each of the set of predictions is associated with a score;
    formulating a proposition based on the candidate or the prediction; and
    presenting the proposition to a user.

38. The system of claim 37, wherein the prefix is empty, entered by a user, or a previous proposition.

39. The system of claim 37, wherein the score of the candidate is based on a score of the prefix concatenated with the input.

40. The system of claim 39, wherein the score of the candidate is based on a score of the input combined with the score of the prefix.

41. The system of claim 40, wherein the candidate is one of a set of candidates where the score of each of the candidates in the set is above a threshold.

42. The system of claim 41, wherein formulating a candidate further comprises ranking the set of candidates based upon the score of each of the candidates.

43. The system of claim 42, wherein formulating a candidate is based on a language model.

44. The system of claim 43, wherein the score of the candidate is based on a string, wherein the string is the longest string in the language model which is a extension of the prefix.

45. The system of claim 37, wherein the prediction is one of a set of predictions.

46. The system of claim 45, wherein formulating a prediction is based on a usage model.

47. The system of claim 46, wherein each of the set of predictions is a sequence corresponding to a path through a tree starting from a node based on the candidate and ending with a terminal node.

48. The system of claim 47, wherein formulating a prediction comprises scoring each of the predictions based on frequency of appearance and length of the path through the tree.

49. The system of claim 45, wherein the device is further operable for determining a set of synonyms for the prediction.

50. The system of claim 49, wherein the set of synonyms is based on the terminal node of the prediction in the tree.

51. The system of claim 50, wherein the set of synonyms is stored in the terminal node.

52. The system of claim 50, wherein the device is further operable for scoring each of the set of synonyms based on a score of the prediction and the score of the candidate on which each synonym is based.

53. The system of claim 52, wherein the device is further operable for ranking the set of synonyms.

54. The system of claim 53, wherein the device is further operable for storing the set of synonyms, the set of predictions and a set of candidates, wherein the set of synonyms, the set of candidates, and the set of predictions are ranked.

55. A method for efficient multilingual text input, comprising:

formulating a set of candidates based on a prefix and an input, wherein each candidate comprises a set of symbols and a score, the score for the candidate is calculated based upon one of a plurality of symbols associated with the input and the prefix and the set of symbols associated with the candidate corresponds to the prefix and the one of the plurality of symbols associated with the input;

determining a set of predictions based on the candidate associated with a first highest score, wherein the set of predictions comprises one or more predictive completions associated with the set of symbols of the candidate and each of the set of predictions is associated with a score;

formulating a proposition based upon the prediction with a second highest score; and presenting the proposition to a user.

* * * * *